(12) United States Patent
Kompala et al.

(10) Patent No.: US 11,354,391 B2
(45) Date of Patent: Jun. 7, 2022

(54) POWER SAVING IN DEVICE WITH ULTRASONIC FINGERPRINT SENSORS

(71) Applicant: QUALCOMM Incorporated, San Diego, CA (US)

(72) Inventors: Surendra Kompala, Hyderabad (IN); Prakash Tiwari, Hyderabad (IN); Vishnu Vardhan Kasilya Sudarsan, Bangalore (IN); Naga Chandan Babu Gudivada, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 596 days.

(21) Appl. No.: 16/048,689

(22) Filed: Jul. 30, 2018

(65) Prior Publication Data

US 2020/0034522 A1 Jan. 30, 2020

(51) Int. Cl.
*G06F 21/32* (2013.01)
*G06V 40/13* (2022.01)
*G06V 40/12* (2022.01)
G06F 3/04842 (2022.01)
G06F 3/0488 (2022.01)

(52) U.S. Cl.
CPC .......... *G06F 21/32* (2013.01); *G06V 40/1306* (2022.01); *G06V 40/1365* (2022.01); *G06F 3/0488* (2013.01); *G06F 3/04842* (2013.01)

(58) Field of Classification Search
CPC .... G06F 21/32; G06F 3/0488; G06F 3/04842; G06F 3/041661; G06F 1/3262; G06K 9/00087; G06K 9/0002
See application file for complete search history.

(56) References Cited

U.S. PATENT DOCUMENTS

| | | | | |
|---|---|---|---|---|
| 8,344,862 | B1* | 1/2013 | Donham | H04M 1/7243 340/407.1 |
| 8,487,899 | B2* | 7/2013 | Chen | G06F 3/0446 345/174 |
| 8,577,422 | B1* | 11/2013 | Ledet | G06F 3/0346 455/566 |
| 2008/0093130 | A1* | 4/2008 | Lee | G06F 3/041661 178/18.01 |

(Continued)

FOREIGN PATENT DOCUMENTS

| | | | |
|---|---|---|---|
| CN | 107491683 A | 12/2017 | |
| EP | 3454248 A1 * | 3/2019 | ........... G06F 3/0488 |
| EP | 3454248 A1 | 3/2019 | |

OTHER PUBLICATIONS

International Search Report and Written Opinion—PCT/US2019/040041—ISA/EPO dated Oct. 4, 2019.

*Primary Examiner* — Olugbenga O Idowu
(74) *Attorney, Agent, or Firm* — Loza & Loza, LLP

(57) ABSTRACT

Aspects generally relate to an apparatus for authenticating a user. The apparatus can include a screen, and located under the screen are a plurality of fingerprint scanners, the plurality of fingerprint scanners corresponding to respective regions of the screen. An interface requests a location of the screen that an application uses for a fingerprint scan. A screen location touched by a user is identified, and based on the screen location touched by the user and the location of the screen that an application uses for a fingerprint scan, enabling fingerprint scanners covering the region of the location of the screen.

20 Claims, 3 Drawing Sheets

(56) References Cited

U.S. PATENT DOCUMENTS

| | | | |
|---|---|---|---|
| 2009/0327678 A1* | 12/2009 | Dutton | G06F 21/575 |
| | | | 713/2 |
| 2014/0253501 A1* | 9/2014 | Noguchi | G06F 3/04166 |
| | | | 345/174 |
| 2015/0123775 A1* | 5/2015 | Kerdemelidis | G08B 6/00 |
| | | | 340/407.1 |
| 2015/0371073 A1* | 12/2015 | Cho | G06K 9/00013 |
| | | | 382/124 |
| 2017/0265810 A1* | 9/2017 | Van De Vyver | A61B 5/6833 |
| 2018/0196990 A1* | 7/2018 | Xu | G06F 21/83 |
| 2019/0027674 A1* | 1/2019 | Zhang | H01L 41/0825 |

* cited by examiner

POWER SAVING IN DEVICE WITH ULTRASONIC FINGERPRINT SENSORS

BACKGROUND

I. Field of the Disclosure

Aspects of the disclosure relate generally to ultrasonic fingerprint sensors, and in particular enabling selected ultrasonic sensors in a user device.

II. Background

Many devices use fingerprint sensors to authenticate a user before allowing the user to active the device and access application. For example, many cellular phones, tables, laptops, and other devices provide a user the option to save their fingerprint scan on the device so the device can be "unlocked" with their fingerprint rather than entering a personal identification number (PIN).

While the fingerprint sensor provides an improved user experience, the fingerprint sensor consumes power, which can adversely affect the duration a battery-operated device can be used before requiring charging.

There is a need for improving power savings in devices with fingerprint sensors.

SUMMARY OF THE DISCLOSURE

The following presents a simplified summary of one or more aspects to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The described aspects generally relate to an apparatus for authenticating a user. The apparatus can include a screen. Located under the screen are a plurality of fingerprint scanners, the plurality of fingerprint scanners corresponding to respective regions of the screen. An interface requests a location of the screen that an application uses for a fingerprint scan. A sensor configured to identify a screen location touched by a user, and based on the screen location touched by the user and the location of the screen that an application uses for a fingerprint scan, enabling fingerprint scanners covering the region of the location of the screen.

The apparatus can also include capacitive touch sensors that detect the location where the screen is touched by the user. Another aspect is that the plurality of fingerprint scanners can cover substantially an entire area of the screen. Another aspect is that if the location where the screen is touch corresponds to the location of the screen that an application uses for a fingerprint scan then a fingerprint scan authentication process is initiated. The fingerprint scan authentication process can include comparing a fingerprint scan to a previously scanned fingerprint. The authentication process can be performed by a processor. Also, determining if the location where the screen is touched corresponds to the location of the screen that an application uses for a fingerprint scan can be done by a user interface (UI).

Another aspect includes using a capacitive touch sensor that detects a location where the screen is touched, and if the location where the screen is touch does not correspond to the location of the screen that an application uses for a fingerprint scan then fingerprint scanners are not enabled and a finger print scan authentication process is not initiated.

Aspects further include a method of authenticating a user. The method can include requesting a location of a screen of a device that an application uses for a fingerprint scan. Identifying a screen location touched by a user, and based on the screen location touched by the user and the location of the screen that an application uses for a fingerprint scan, determining if fingerprint sensors covering the region of the location of the screen that an application uses for a fingerprint scan are enabled.

Another aspect includes that a user interface requests the location of the screen of the device that an application uses for a fingerprint scan. An aspect is that a capacitive sensor can identify a screen location touched by the user. An aspect is that if the screen location touched by the user, and the location of the screen that an application uses for a fingerprint scan overlap, enabling fingerprint scanners covering the region of the location of the screen that the application uses for a fingerprint scan. Another aspect is that if the location where the screen is touch corresponds to the location of the screen that an application uses for a fingerprint scan then a fingerprint scan authentication process is initiated. The fingerprint scan authentication process can include comparing a fingerprint scan to a previously scanned fingerprint. The authentication process can be performed by a processor.

Another aspect is that if the screen location touched by the user, and the location of the screen that an application uses for a fingerprint scan do not overlap, not enabling fingerprint scanners.

Additional aspects of authenticating a user include means for requesting a location of a screen of a device that an application uses for a fingerprint scan, and means for identifying a screen location touched by a user, and based on the screen location touched by the user and the location of the screen that an application uses for a fingerprint scan, determining if fingerprint sensors covering the region of the location of the screen that an application uses for a fingerprint scan are enabled. Another aspect include means for authenticating a user based on a fingerprint scan.

Various aspect and features of the disclosure are described in further detail below.

BRIEF DESCRIPTION OF THE FIGURES

The accompanying drawings are presented to aid in the description and illustrations of embodiments and are not intended to be limitations thereof.

The drawings may not depict all components of a particular apparatus, structure, or method. Further, like reference numerals denote like features throughout the specification and figures.

DETAILED DESCRIPTION

Figure 1:
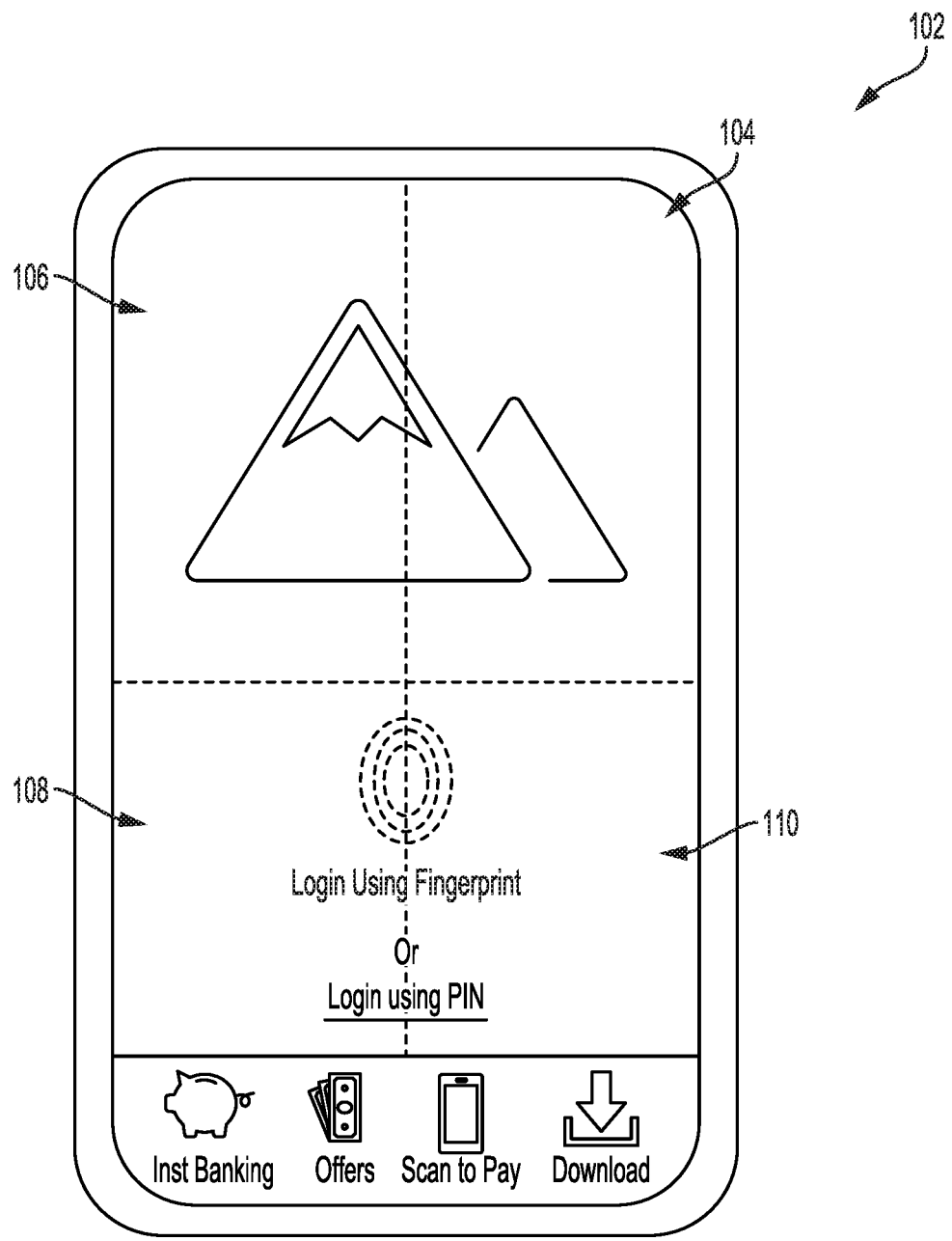
FIG. 1 is a diagram of a display of a user device.

Aspects disclosed in the following description and related drawings are directed to specific embodiments. Alternative embodiments may be devised without departing from the scope of the invention. Additionally, well-known elements may not be described in detail, or may be omitted, so as not to obscure relevant details. Embodiments disclosed may be suitably included in any electronic device.

With reference now to the drawing, several exemplary aspects of the present disclosure are described. The word "exemplary" is used herein to mean "serving as an example, instance, or illustration." Any aspect described herein as "exemplary" is not necessarily to be construed as preferred or advantageous over other aspects. Furthermore, the terminology used herein is for the purpose of describing particular embodiments and is not intended to be limiting Modern fingerprint scanners, such as ultrasonic fingerprint scanners, used for user authentication are capable of scanning through displays, thick glass, and even metal. To enhance user experience and allow a user to touch any portion of the screen of a device and be authenticated, device manufactures are beginning to integrate fingerprint scanners under the entire screen of a device.

To cover the entire screen, device manufacturers employ multiple fingerprint scanners to cover the entire display. For example, if a screen is 4×10 inches or centimeters, then a manufacturer can install four sensors that are 2×5 to cover the entire screen area.

In general, authentication involves the following operations. First the user interface (UI) enables (powers On) the fingerprint scanners of the device. Then, the ultrasonic fingerprint scanners scan the area of the screen that they cover to detect if there is a finger present. Once a fingerprint has been detected by a scanner the fingerprint is authenticated. Authentication typically includes transmitting the scanned fingerprint over a peripheral bus, such as SPI, I2C, I3C, and the like, to a processor where the scanned fingerprint is compared to a fingerprint of the user previously stored in memory. If the scanned fingerprint matches the previously stored fingerprint, then the device will unlock and allow operation by the user.

In other embodiments, during operation of a device different areas of a screen may be used to authenticate the user before performing an operation. For example, if a device is being used to make an online purchase, or as a payment device at a terminal, such as a store terminal, or transferring cash, an application can ask the user to authenticate themselves prior to the transaction to insure they are an authorized user. Likewise, if an application, such as a brokerage application is being used to buy and sell stock, the application may authenticate the user, as described further below, before making a transaction.

Using multiple fingerprint scanners can improve the user experience, but each fingerprint scanner consumes power during operation even if the user's finger is only scanned by one of the fingerprint scanners. The power consumed by the fingerprint scanners covering an area not touched by the user wastes energy and can decrease operating time of a battery-operated device.

FIG. 1 is a diagram of a display 102 of a user device. As shown in FIG. 1, the area of the display 102 can be divided into multiple areas or regions, such as an upper right region 104, and upper left region 106, a lower left region 108, and a lower right region 110. Fingerprint scanners, such as ultrasonic fingerprint scanners, are positioned to cover each of the regions 104, 106, 108, and 110, so that the entire screen is covered with fingerprint scanners.

When authenticating a user any location on the screen 102 can be used, but as the example of FIG. 1 illustrates the upper left region 104 and upper right region 106 are displaying an image and the lower left region 104 and lower right region 110 are for the user to login to the device. In this example, a user interface (UI) application determines that only the fingerprint scanners in the lower left region 108 and lower right region 110 need to be enabled. Enabling the fingerprint scanners for the lower left region 108 and lower right region 110 and disabling the fingerprint scanners for the upper left region 104 and upper right region 106 reduce the overall power required for the authenticating process. In addition, as described further below, the UI should ensure that when the user touches the portion of the screen labeled "Login using PIN" the fingerprint authentication application does not run, and the user can input their PIN to unlock the device.

In the example of FIG. 1, the lower left region 108 and lower right region 110 are used for authentication and the respective fingerprint scanners are enabled. In other embodiments, other combinations of regions of the display can be used for authentication, or only a single region can be used for authentication, with the respective fingerprint scanner(s) enabled and the other fingerprint scanners disabled to reduce power consumption.

Figure 2:
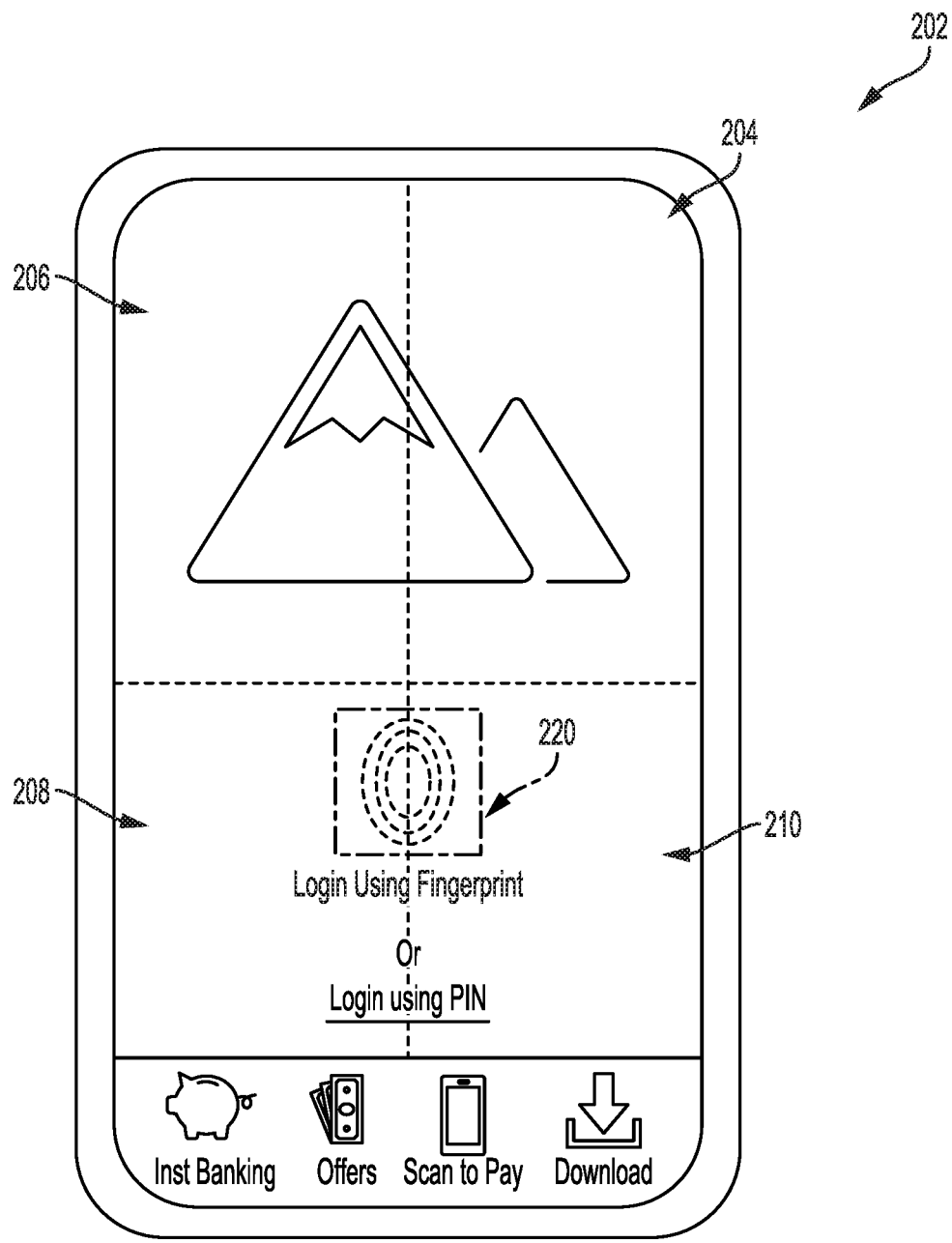
FIG. 2 is a diagram of a display of a user device.

FIG. 2 is a diagram of a display 202 of a user device. As shown in FIG. 2, the area of the display 202 can be divided into multiple areas or regions, such as an upper right region 204, and upper left region 206, a lower left region 208, and a lower right region 210. Ultrasonic fingerprint scanners are positioned to cover each of the regions 204, 206, 208, and 210, so that the entire screen is covered with fingerprint scanners.

In the example of FIG. 2, the user interface (UI) requests, from an application that is running, a screen location 220 that the application wants the user to place their finger for fingerprint authentication. When the user touches the screen, the UI receives the location of the screen touched, for example, using capacitive touch sensors of the display. If the screen location 220 received from the application overlaps with the location received from the capacitive touch sensors, then the UI can enable (power On) the corresponding fingerprint sensors, in this example the lower left region 208 and lower right region 210.

Once a fingerprint has been scanned by a scanner the fingerprint is authenticated. Authentication typically includes powering a peripheral bus, such as SPI, 12C, 13C, and the like, and transmitting the scanned fingerprint over the peripheral bus to a processor where the scanned fingerprint is compared to a fingerprint previously stored in memory. If the scanned fingerprint matches the previously stored fingerprint, then the device will unlock and allow operation by the user.

As illustrated in FIG. 2, if the user touches a region of the screen that is not in the identified screen location 220 the fingerprint scanners are not enabled, because there is no overlap with the identified screen location 220 and the authentication process is not performed. In this way, if the user touches the area of the screen labeled "Login using PIN" the fingerprint authentication will not proceed, and the user can unlock the device by entering their PIN.

Enabling the fingerprint scanners corresponding to the screen location identified by the application where a user should place their finger reduces power consumption by enabling fingerprint scanners covering the identified region rather than all of the fingerprint scanners, and only enabling the corresponding fingerprint scanners when a user is touching the screen location. In addition, there is additional power reduction by only processing the fingerprint scan when the user touches the identified location thereby only performing the authentication process and powering the peripheral bus to compare the scanned fingerprint to a previously stored fingerprint scan.

As noted above in other embodiments, during operation of a device different areas of a screen may be used to authenticate the user before performing an operation. For example, if a device is being used to make an online purchase, or as a payment device at a terminal, such as a store terminal, or transferring cash, the application can ask the user to authenticate themselves prior to the transaction to insure they are an authorized user. Likewise, if an application, such as a brokerage application is being used to buy and sell stock, the application may authenticate the user.

Figure 3:
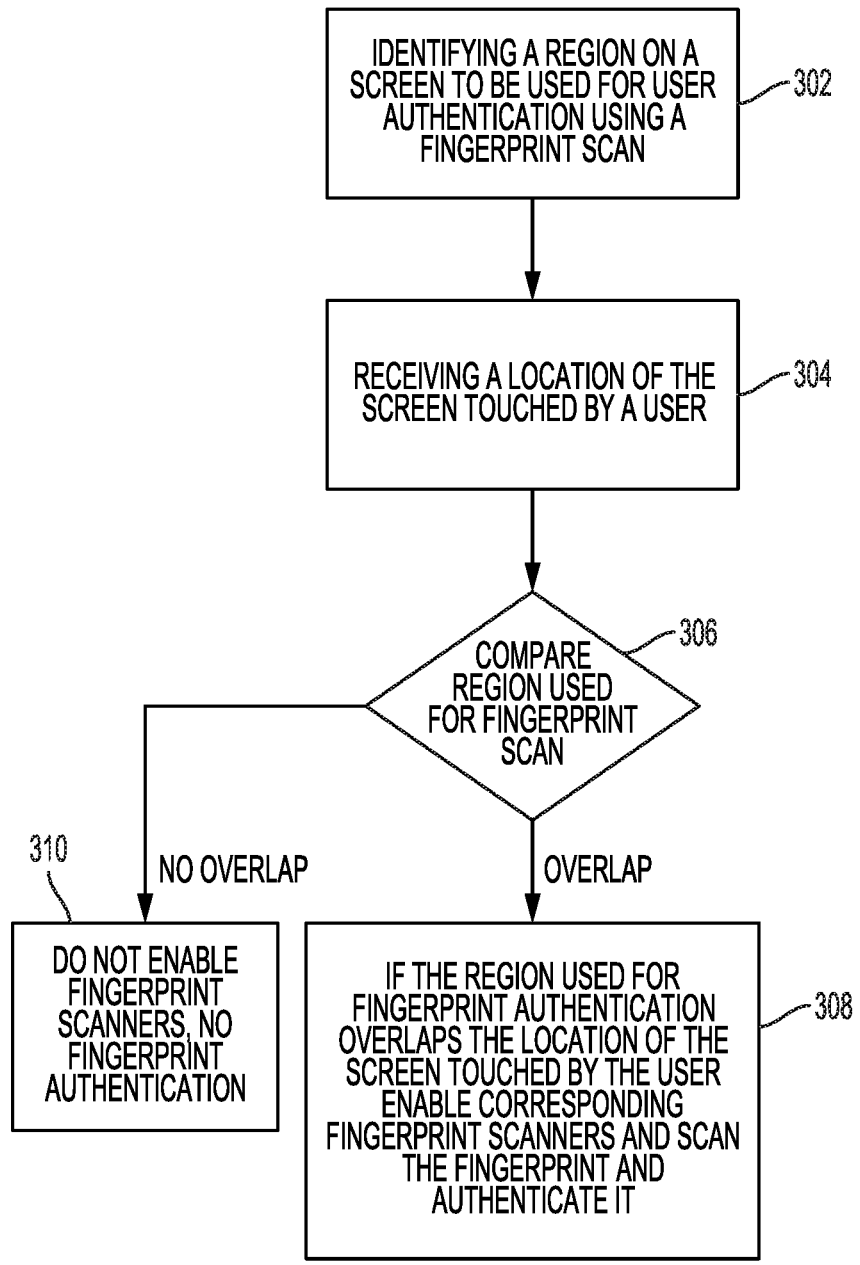
FIG. 3 is a flow chart of authenticating a user of a device.

FIG. 3 is a flow chart of authenticating a user of a device. Flow begins in block 302 where a region on a screen to be used for user authentication using a fingerprint scan is identified. The identification can be done by the UI of the device in various ways. For example, the UI can request that an application that is going to authenticate a user provide the region on the screen where the user will be asked to place their finger.

Flow continues to block 304 where a location of the screen touched by a user is received. The location of the screen touched by the user can be determined in various ways. For example, the location can be determined using capacitive touch sensors of the display.

Flow continues to block 306 where the region used for fingerprint authentication is compared to the location of the screen touched by the user. If the region used for fingerprint authentication overlaps the location of the screen touched by the user, flow continues to block 308.

In block 308 fingerprint scanner(s) corresponding to the fingerprint authentication region are enabled. When the fingerprint scanner is enabled then the fingerprint is scanned, and the scanned fingerprint is authenticated. As discussed above authentication includes transmitting the scanned fingerprint over a peripheral bus, such as SPI, I2C, I3C, and the like, to a processor where the scanned fingerprint is compared to a fingerprint previously stored in memory. If the scanned fingerprint matches the previously stored fingerprint, then the device will unlock and allow operation by the user.

Returning to block 306, if the region used for fingerprint authentication does not overlap the location of the screen touched by the user, flow continues to block 310. In block 310 none of the fingerprint scanners are enabled and no fingerprint authentication is performed.

The various illustrative logical blocks, modules, and circuits described in connection with the aspects disclosed herein may be implemented or performed in an integrated circuit (IC), a system on a chip (SoC), an Application Specific Integrated Circuit (ASIC), a Field Programmable Gate Array (FPGA) or other programmable logic device, discrete gate or transistor logic, discrete hardware components, or any combination thereof designed to perform the functions described herein.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in flow chart diagrams may be subject to numerous different modifications as will be readily apparent to one of skill in the art.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An apparatus for authenticating a user comprising:
   a screen;
   a plurality of fingerprint scanners located under the screen, each fingerprint scanner of the plurality of fingerprint scanners corresponding to a different respective region of the screen;
   an interface configured to request, from a running application, an application-determined scan location on the screen for executing a fingerprint scan; and
   a touch sensor configured to:
      activate one or more of the plurality of fingerprint scanners corresponding to one or more regions of the screen that include the application-determined scan location in response to receiving an indication of a touch input on the application-determined scan location, and
      prevent an activation of one or more other of the plurality of fingerprint scanners in response to receiving an indication of a touch input on one or more regions of the screen that does not include the application-determined scan location.

2. The apparatus of claim 1, wherein the touch sensor is a capacitive sensor.

3. The apparatus of claim 1, wherein the touch sensor is an ultrasonic sensor.

4. The apparatus of claim 1, wherein if a location where the screen is touched corresponds to the application-determined scan location of the screen, then a fingerprint scan authentication process is initiated.

5. The apparatus of claim 4, wherein the fingerprint scan authentication process comprises transmitting a fingerprint scan over a peripheral bus.

6. The apparatus of claim 4, wherein the fingerprint scan authentication process comprises comparing a fingerprint scan to a previously scanned fingerprint.

7. The apparatus of claim 4, wherein the fingerprint scan authentication process is performed by a processor.

8. The apparatus of claim 4, wherein determining if a location where the screen is touched corresponds to the application-determined scan location of the screen is done by a user interface (UI).

9. The apparatus of claim 1, wherein the plurality of fingerprint scanners cover an entire area of the screen.

10. A method of authenticating a user comprising:
    requesting, from a running application, an application-determined scan location on a screen of a device for executing a fingerprint scan; and
    determining whether to activate or prevent from activating one or more fingerprint scanners corresponding to one or more regions of the screen that include the application-determined scan location based on whether an indication of a touch input is received on a region of the screen that includes the application-determined scan location and whether an indication of a touch input is received on a region of the screen that does not include the application-determined scan location, wherein the one or more fingerprint scanners are of a plurality of fingerprint scanners each corresponding to a different region of the screen;

activating one or more of the plurality of fingerprint scanners corresponding to one or more regions of the screen that include the application-determined scan location in response to receiving an indication of a touch input on the application-determined scan location; and preventing an activation of one or more other of the plurality of fingerprint scanners in response to receiving an indication of a touch input on a region of the screen that does not include the application-determined scan location.

11. The method of claim 10, wherein a user interface requests the application-determined scan location of the screen of the device.

12. The method of claim 10, wherein a capacitive sensor identifies a screen location touched by the user.

13. The method of claim 10, wherein an ultrasonic sensor identifies a screen location touched by the user.

14. The method of claim 10, wherein if a screen location touched by the user and the application-determined scan location of the screen overlap, then enabling fingerprint scanners covering a region of a location of the screen that the application uses for a fingerprint scan.

15. The method of claim 10, wherein if a location where the screen is touched corresponds to the application-determined scan location of the screen, then a fingerprint scan authentication process is initiated.

16. The method of claim 15, wherein the fingerprint scan authentication process comprises transmitting a fingerprint scan over a peripheral bus.

17. The method of claim 15, wherein the fingerprint scan authentication process comprises comparing a fingerprint scan to a previously scanned fingerprint.

18. An apparatus for authenticating a user comprising:
means for requesting, from a running application, an application-determined scan location on a screen of a device for executing a fingerprint scan;
means for activating one or more fingerprint scanners of a plurality of fingerprint scanners corresponding to one or more regions of the screen that include the application-determined scan location in response to receiving an indication of a touch input on the application-determined scan location; and
means for preventing an activation of one or more other fingerprint scanners of the plurality of fingerprint scanners in response to receiving an indication of a touch input on one or more regions of the screen that does not include the application-determined scan location.

19. The apparatus of claim 1, wherein preventing the activation of the one or more other fingerprint scanners of the plurality of fingerprint scanners comprises preventing the activation of all of the plurality of fingerprint scanners.

20. The method of claim 10, wherein preventing the activation of the one or more other of the plurality of fingerprint scanners in response to receiving the indication of the touch input on the region of the screen that does not include the application-determined scan location comprises preventing an activation of all of the plurality of fingerprint scanners associated with the screen.

* * * * *